(12) United States Patent
Kilitcioglu et al.

(10) Patent No.: US 12,169,870 B2
(45) Date of Patent: Dec. 17, 2024

(54) AUTOMATIC DATA-DRIVEN OPTIMIZATION OF A TARGET OUTCOME USING MACHINE LEARNING

(71) Applicant: FMR LLC, Boston, MA (US)

(72) Inventors: Doruk Kilitcioglu, Somerville, MA (US); Serdar Kadioglu, Somerville, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/108,715

(22) Filed: Feb. 13, 2023

(65) Prior Publication Data

US 2024/0273623 A1    Aug. 15, 2024

(51) Int. Cl.
*G06Q 40/04* (2012.01)
(52) U.S. Cl.
CPC .................................. *G06Q 40/04* (2013.01)
(58) Field of Classification Search
None
See application file for complete search history.

(56) References Cited

U.S. PATENT DOCUMENTS

| | | | | |
|---|---|---|---|---|
| 7,516,095 | B1 * | 4/2009 | Torre ..................... | G06Q 10/10 |
| | | | | 705/37 |
| 9,830,659 | B2 * | 11/2017 | Santner .................. | G06Q 40/06 |
| 10,115,162 | B1 * | 10/2018 | Karlsson ................. | G06F 30/20 |
| 10,282,785 | B1 | 5/2019 | Yager et al. | |
| 11,037,105 | B2 | 6/2021 | Roy et al. | |
| 2010/0030699 | A1 * | 2/2010 | Caputo .................. | G06Q 40/06 |
| | | | | 705/36 R |

OTHER PUBLICATIONS

N.S. Altman, "An Introduction to Kernel and Nearest Neighbor Nonparametric Regression," The American Statistician, vol. 46, No. 3 (Aug. 1992), pp. 175-185.

B. Doerr et al., "Fast Genetic Algorithms," arXiv:1703.03334v2 [cs.NE] Mar. 15, 2017, available at https://arxiv.org/pdf/1703.03334, 31 pages.

L. Meunier et al., "Black-Box Optimization Revisited: Improving Algorithm Selection Wizards through Massive Benchmarking," arXiv:2010.04542v3 [cs.LG] Feb. 23, 2021, available at https://arxiv.org/pdf/2010.04542, 18 pages.

A. Abedllatif et al., "A Comparison of Natural Language Understanding Platforms for Chatbots in Software Engineering," arXiv:2012.02640v2 [cs.SE] Jul. 22, 2021, available at https://arxiv.org/pdf/2012.02640, 19 pages.

* cited by examiner

*Primary Examiner* — Narayanswamy Subramanian
(74) *Attorney, Agent, or Firm* — Cesari and McKenna, LLP

(57) ABSTRACT

Methods and apparatuses are described for automatic data-driven optimization of a target outcome using machine learning. A server generates a first feature dataset and applies a trained outcome prediction model to the first feature dataset as input to generate a second feature data set and a first predicted value for a target outcome. The server displays the first predicted value on a client device. The server receives input corresponding to one or more preferences or constraints from the client device and adjusts the trained outcome prediction model based upon the received input to incorporate the one or more preferences or constraints. The server applies the adjusted outcome prediction to the second feature dataset as input to generate a third feature data set a second predicted value for the target outcome. The server displays the second predicted value on the client device.

28 Claims, 9 Drawing Sheets

| Static Attributes | | | Dynamic Attributes | | Target Outcome |
|---|---|---|---|---|---|
| Age | Location | Income | Expenses | Contributions | Retirement Score |
| 34 | Lynn, MA | $100K | $70K | 4% | 67 |
| 44 | Columbus, OH | $86K | $45K | 8% | 72 |
| ... | ... | ... | ... | ... | ... |
| 52 | Tampa, FL | $77K | $51K | 3% | 62 |
| 36 | Austin, TX | $240K | $150K | 12% | 95 |

Figure 5A:
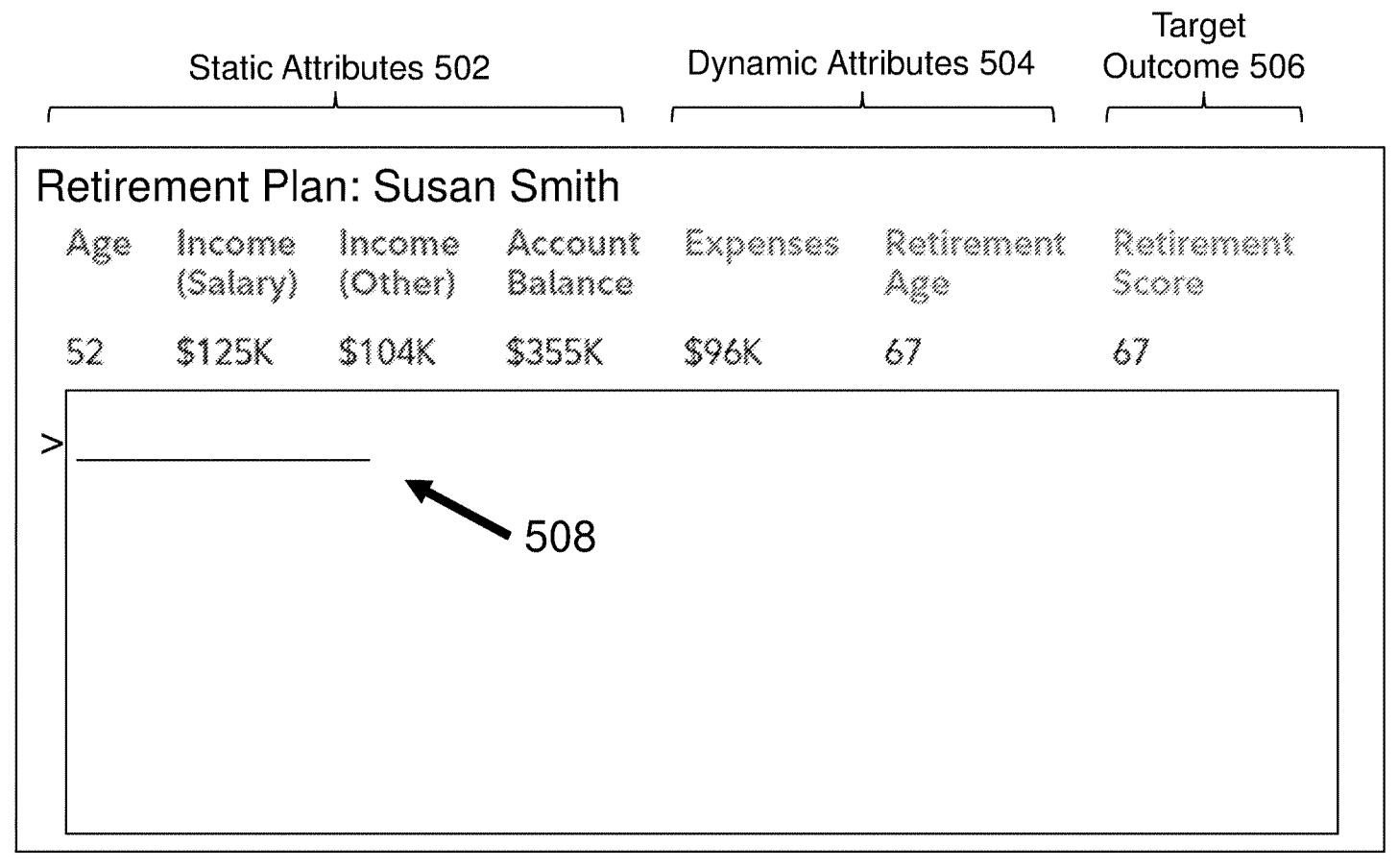

Retirement Plan: Susan Smith

| Static Attributes 502 | | | Dynamic Attributes 504 | | Target Outcome 506 |
|---|---|---|---|---|---|
| Age | Income (Salary) | Income (Other) | Account Balance | Expenses | Retirement Age | Retirement Score |
| 52 | $125K | $104K | $355K | $96K | 67 | 67 |

AUTOMATIC DATA-DRIVEN OPTIMIZATION OF A TARGET OUTCOME USING MACHINE LEARNING

TECHNICAL FIELD

This application relates generally to methods and apparatuses, including computer program products, for automatic data-driven optimization of a target outcome using machine learning.

BACKGROUND

Large consumer-facing companies constantly face the challenge of retaining their existing customers and expanding to reach new customers, especially considering the fragmentation and diversity of customer bases. Companies want to recommend products and services to each customer that take the customer's preferences, demographics, and needs into account. For example, diversity of a customer base can arise from different demographics like age, location, life events (marriage, retirement, etc.), personal situations and needs, time of the year, macro-economic factors, demand for the new products in the market, and the like. For customer-focused organizations, it is imperative to identify and address the specific personalized needs of each of the customers which, if not done, might lead to attrition of the customer base (and thus a decrease in revenue).

Current recommender systems have been developed using artificial intelligence techniques in an attempt to solve the above problems. For example, these systems can utilize classification modeling that tries to predict an optimized target outcome or result for a given user based upon historical outcome data and static user attributes associated with other users. However, these systems often lack robust mechanisms to generate personalized recommendations, with scoring dynamics that are unknown and user preferences change after being presented with a certain outcome. In addition, such recommender systems require generation of additional data in order to train, re-train and/or execute the classification model. In some instances, the generation of additional data can impose a significant processing burden on the overall computing system and lead to a less-than-desirable user experience. Furthermore, generation of additional data might be impossible due to practical considerations (e.g., the time it takes to collect one real-world data point) or due to third-party ownership of datasets and/or data generation techniques.

SUMMARY

Therefore, what is needed are methods and systems that overcome the above drawbacks of existing recommender systems by providing for generation of and iteration on a target outcome using data-driven optimization that dynamically adjusts input variables while also accounting for specific user feedback in the form of preferences and constraints. The techniques described herein beneficially leverage a machine learning (ML) model that comprises an optimizer for defining dynamic user attributes and optimization hyperparameters that are used to execute a value predictor (e.g., classification model) to generate a prediction for the target outcome.

The invention, in one aspect, features a system for automatic data-driven optimization of a target outcome using machine learning. The system comprises a server computing device with a memory for storing computer-executable instructions and a processor that executes the computer-executable instructions. The server computing device generates a first feature dataset. The server computing device executes a trained outcome prediction model using the first feature dataset to generate a second feature data set and a first predicted value for a target outcome based upon the second feature dataset. The server computing device displays the second feature dataset and the first predicted value on a client computing device. The server computing device receives input corresponding to one or more preferences or constraints from the client computing device. The server computing device adjusts the trained outcome prediction model to incorporate the one or more preferences or constraints by changing the second feature dataset based upon the received input. The server computing device executes the adjusted outcome prediction model to generate a third feature data set and a second predicted value for the target outcome based upon the third feature data set. The server computing device displays the third feature dataset and the second predicted value on the client computing device.

The invention, in another aspect, features a computerized method of automatic data-driven optimization of a target outcome using machine learning. A server computing device generates a first feature dataset. The server computing device executes a trained outcome prediction model using the first feature dataset to generate a second feature data set and a first predicted value for a target outcome based upon the second feature dataset. The server computing device displays the second feature dataset and the first predicted value on a client computing device. The server computing device receives input corresponding to one or more preferences or constraints from the client computing device. The server computing device adjusts the trained outcome prediction model to incorporate the one or more preferences or constraints by changing the second feature dataset based upon the received input. The server computing device executes the adjusted outcome prediction model to generate a third feature data set and a second predicted value for the target outcome based upon the third feature data set. The server computing device displays the third feature dataset and the second predicted value on the client computing device.

The invention, in another aspect, features a system for automatic data-driven optimization of a retirement plan target outcome using machine learning. The system includes a server computing device with a memory for storing computer-executable instructions and a processor that executes the computer-executable instructions. The server computing device generates a user feature dataset comprising static attributes and dynamic attributes for each of a plurality of users. The server computing device trains an outcome prediction model using the user feature dataset to generate predicted values for a retirement plan target outcome. The server computing device identifies one or more first user attributes associated with a user of a client computing device. The server computing device executes the trained outcome prediction model using the first user attributes to generate one or more second user attributes and a first predicted retirement plan score based upon the second user attributes. The server computing device displays the second user attributes and the first predicted retirement plan score to the user of the client computing device. The server computing device receives user input corresponding to one or more preferences or constraints from the user of the client computing device. The server computing device adjusts the trained outcome prediction model to incorporate the one or more preferences or constraints by changing one or more of the second user attributes based upon the user input. The server computing device executes the adjusted outcome prediction model to generate one or more third user attributes and a second predicted retirement plan score based upon the one or more third user attributes. The server computing device displays the third user attributes and the second predicted retirement plan score to the user of the client computing device.

The invention, in another aspect, features a computerized method of automatic data-driven optimization of a retirement plan target outcome using machine learning. A server computing device generates a user feature dataset comprising static attributes and dynamic attributes for each of a plurality of users. The server computing device trains an outcome prediction model using the user feature dataset to generate predicted values for a retirement plan target outcome. The server computing device identifies one or more first user attributes associated with a user of a client computing device. The server computing device executes the trained outcome prediction model using the first user attributes to generate one or more second user attributes and a first predicted retirement plan score based upon the second user attributes. The server computing device displays the second user attributes and the first predicted retirement plan score to the user of the client computing device. The server computing device receives user input corresponding to one or more preferences or constraints from the user of the client computing device. The server computing device adjusts the trained outcome prediction model to incorporate the one or more preferences or constraints by changing one or more of the second user attributes based upon the user input. The server computing device executes the adjusted outcome prediction model to generate one or more third user attributes and a second predicted retirement plan score based upon the one or more third user attributes. The server computing device displays the third user attributes and the second predicted retirement plan score to the user of the client computing device.

Any of the above aspects can include one or more of the following features. In some embodiments, identifying one or more first user attributes associated with a user of a client computing device comprises receiving a request to access a retirement plan application from the client computing device, the request including authentication credentials associated with the user; locating a user profile data structure for the user based upon the authentication credentials; and selecting the one or more first user attributes associated with the user from the user profile data structure. In some embodiments, the one or more first user attributes comprise static user attributes and dynamic user attributes. In some embodiments, the static user attributes comprise an age of the user, an income of the user and an account balance of the user, and the dynamic user attributes comprise a retirement expense amount of the user and a retirement age of the user.

In some embodiments, the user input corresponding to one or more preferences or constraints comprises a text string corresponding to an utterance of the user. In some embodiments, adjusting the trained outcome prediction model to incorporate the one or more preferences or constraints by changing one or more of the second user attributes based upon the user input comprises converting the text string into one or more adjustment operations; and applying the adjustment operations to change one or more of the second user attributes. In some embodiments, converting the text string into one or more adjustment operations comprises determining one or more intents associated with the text string using a natural language processor; and mapping the one or more intents to the one or more adjustment operations.

In some embodiments, the server computing device receives additional user input corresponding to one or more additional preferences or constraints from the user of the client computing device; re-adjusts the adjusted outcome prediction model to incorporate the one or more additional preferences or constraints by changing one or more of the third user attributes based upon the additional user input; executes the re-adjusted outcome prediction model to generate one or more fourth user attributes and a third predicted retirement plan score based upon the one or more fourth user attributes; and displays the fourth user attributes and the third predicted retirement plan score to the user of the client computing device. In some embodiments, the server computing device transmits instructions comprising the third user attributes to a remote computing device for updating the user's retirement plan. In some embodiments, the server computing device transmits the instructions to the remote computing device upon determining that the second predicted retirement plan score meets or exceeds a predetermined threshold. In some embodiments, the server computing device transmits the instructions to the remote computing device upon receiving score acceptance indicia from the user of the client computing device.

In some embodiments, the outcome prediction model comprises a predictor function and an optimizer function. In some embodiments, the predictor function comprises a K-nearest neighbor regression algorithm and the optimizer function comprises a black-box optimization (BBO) algorithm. In some embodiments, the user feature dataset comprises a synthetic user feature dataset created through automated variation of the static attributes and the dynamic attributes.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 4 is a diagram of an exemplary user feature dataset generated by model training and execution module for retirement plan optimization.

FIG. 5A is a diagram of an exemplary user interface generated by user interface module for display of the second user attributes and the first predicted retirement plan score.

DETAILED DESCRIPTION

Figure 1:
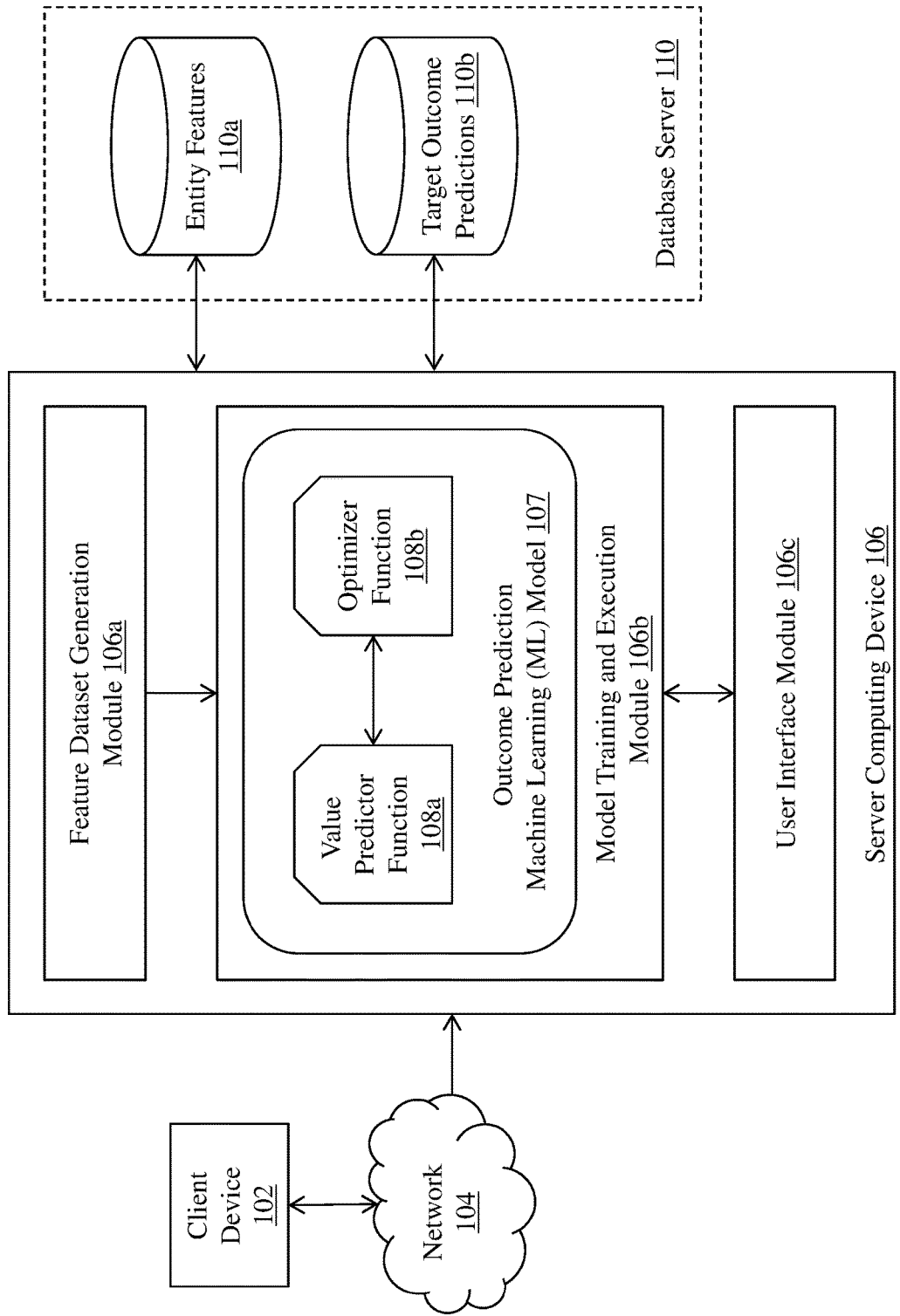
FIG. 1 is a block diagram of a system for automatic data-driven optimization of a target outcome using machine learning.

FIG. 1 is a block diagram of system 100 for automatic data-driven optimization of a target outcome using machine learning. System 100 includes client computing device 102, communications network 104, server computing device 106 that includes feature dataset generation module 106a, model training and execution module 106b, and user interface module 106c. Model training and execution module 106b includes outcome prediction machine learning (ML) model 107 with value predictor function 108a and optimizer function 108b. System 100 also includes database server 110 comprising user features database 110a and target outcome predictions database 110b.

Client computing device 102 connects to communication network 104 in order to communicate with server computing device 106 to provide input and receive output relating to the process of automatic data-driven optimization of a target outcome using machine learning as described herein. In some embodiments, client computing device 102 is coupled to an associated display device (not shown). For example, client computing device 102 can provide a graphical user interface (GUI) via the display device that is configured to receive input from a user of the device 102 (e.g., via one or more user interface elements) and to present output (e.g., documents, reports, digital content items, other visual elements) to the user that results from the methods and systems described herein.

Exemplary client computing devices 102 include but are not limited to desktop computers, laptop computers, tablets, mobile devices, smartphones, and internet appliances. It should be appreciated that other types of computing devices that are capable of connecting to the components of system 100 can be used without departing from the scope of invention. Although FIG. 1 depicts a single client computing device 102, it should be appreciated that system 100 can include any number of client computing devices.

Communications network 104 enables the client computing device 102 to communicate with server computing device 106. Network 104 is typically a wide area network, such as the Internet and/or a cellular network. In some embodiments, network 104 is comprised of several discrete networks and/or sub-networks (e.g., cellular to Internet).

Server computing device 106 is a device including specialized hardware and/or software modules that execute on a processor and interact with memory modules of server computing device 106, to receive data from other components of system 100, transmit data to other components of system 100, and perform functions for automatic data-driven optimization of a target outcome using machine learning as described herein. As mentioned above, server computing device 106 includes feature dataset generation module 106a, model training and execution module 106b, and user interface module 106c, which execute on one or more processors of server computing device 106. In some embodiments, model 107 and its functions 108a, 108b are specialized sets of computer software instructions programmed onto one or more dedicated processors in server computing device 106 and can include specifically designated memory locations and/or registers for executing the specialized computer software instructions.

Although the modules 106a-106c and model 107 are shown in FIG. 1 as executing within the same server computing device 106, in some embodiments the functionality of the modules 106a-106c and model 107 can be distributed among a plurality of server computing devices. As shown in FIG. 1, server computing device 106 enables modules 106a-106c and model 107 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. Exemplary functionality of modules 106a-106c and model 107 is described in detail below.

Database server 110 is a computing device (or set of computing devices) coupled to server computing device 106 and the databases are configured to receive, generate, and store specific segments of data relating to the process of automatic data-driven optimization of a target outcome using machine learning as described herein. Database server 110 comprises a plurality of databases, including entity features database 110a and target outcome predictions database 110b. In some embodiments, the entire databases 110a-110b or a portion of the databases 110a-110b can be integrated with server computing device 106 or be located on a separate computing device or devices. Databases 110a-110b can comprise one or more databases configured to store portions of data used by the other components of system 100, as will be described in greater detail below.

In some embodiments, entity features database 110a comprises user attributes corresponding to a plurality of users of system 100. The user attributes can include static user attributes and dynamic user attributes. In an exemplary application involving prediction of retirement plan scores, the static user attributes can include but are not limited to demographic information such as age, income, and account balance(s); and the dynamic user attributes can include but are not limited to amount of estimated retirement expenses and estimated retirement age. As can be appreciated, the above attributes are merely examples for a particular application of the technology described herein and other types of attributes can be used for different applications of the technology. Also, as will be described herein, system 100 can utilize one or more of the static user attributes to generate predictions of one or more dynamic user attributes and predictions of a target outcome value via outcome prediction ML model 107. In addition, system 100 can utilize one or more of the static user attributes and/or the dynamic user attributes as further input to outcome prediction ML model 107 to generate additional predictions of dynamic user attributes and target outcome values.

In some embodiments, the user feature dataset comprises a synthetic user feature dataset created through automated variation of the static attributes and the dynamic attributes.

Feature dataset generation module 106a can receive a baseline set of user features from historical data and automatically generate additional user feature data by applying a series of variations to the baseline set to generate user feature data that is not directly attributable to a given user.

In some embodiments, target outcome predictions database 110b comprises data and/or metadata associated with predictions generated by outcome prediction ML model 107. For example, database 110b can store target outcome prediction values and user attributes generated by model 107 for transmission to, e.g., client computing device 102 and/or other remote computing devices for actions and insights. For example, in the application involving retirement planning, database 110b can provide a predicted retirement plan score and/or dynamic user attributes associated with the predicted score to, e.g., a retirement planning computing device that is configured to generate retirement plan implementation instructions for the user based upon the score and/or attributes.

Figure 2:
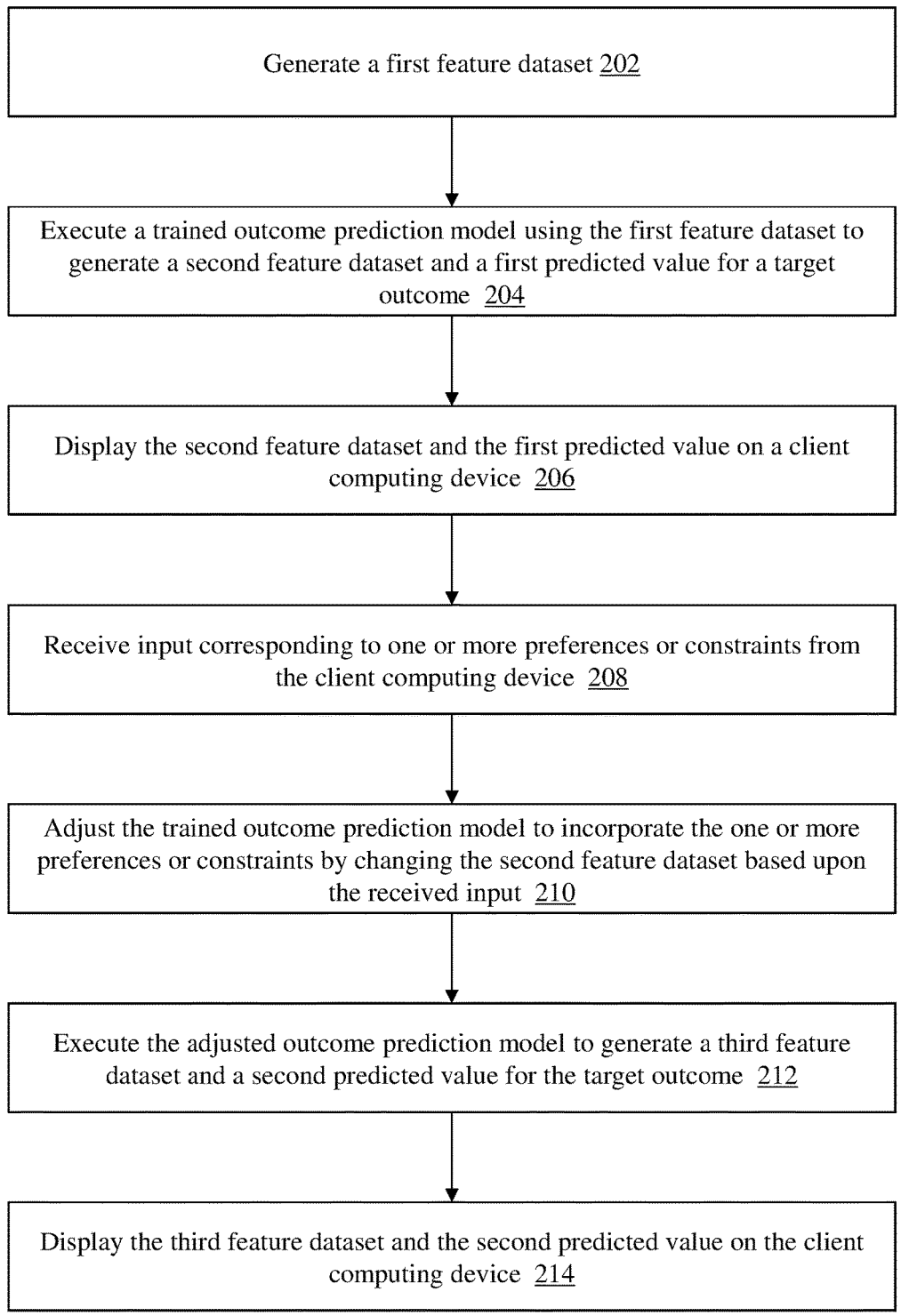
FIG. 2 is a flow diagram of a computerized method of automatic data-driven optimization of a target outcome using machine learning.

A general framework for automatic data-driven optimization of a target outcome using machine learning is presented. FIG. 2 is a flow diagram of the automatic data-driven optimization of a target outcome using machine learning, using system 100 of FIG. 1. Feature dataset generation module 106a generates (step 202) a first feature dataset. In some embodiments, the first feature dataset comprises attributes for an entity or a plurality of entities. Generally, an entity comprises a unit for which the system solves an optimization problem to generate the target outcome. In some examples, an entity is a user (e.g., optimize retirement age and savings for the user to achieve a target retirement plan score based upon certain user preferences and constraints). In this case, the first feature dataset comprises user attributes for each of a plurality of different users. However, an entity can be other types of units such as objects (e.g., optimize a set of components for building a computer to achieve a target cost or target performance characteristics based upon attributes such as budget, hardware preferences, source of components, etc.) or specific conditions relating to places or objects (e.g., optimize a path of a car on a racetrack to achieve a target time based upon attributes such as car position, car operational parameters, layout of the racetrack, etc.)

In some embodiments, the first feature dataset is generated in part based upon historical data. For example, feature dataset generation module 106a can retrieve one or more historical data elements from database 110a and generate the first feature dataset using the historical data. In the example of the racetrack optimization problem described above, module 106a can retrieve attributes recorded during historical driving runs performed by different cars and/or drivers on a given racetrack. In some embodiments, the first feature dataset comprises one or more static attributes and one or more dynamic attributes. As can be appreciated, static attributes are fixed and do not change when the ML model 107 is executed to determine an optimized target outcome. In the racetrack example, static attributes can be the layout of the racetrack (e.g., length, position of turns or curves, etc.). On the other hand, dynamic attributes are changeable by the ML model 107 during execution in order to determine the optimized target outcome. In the racetrack example, dynamic attributes can be, e.g., position and direction of the car at each different point along the racetrack, velocity of the car, gear shifting, etc.

Feature dataset generation module 106a provides at least a portion of the first feature dataset to model training and execution module 106b for execution of ML model 107 to predict a target outcome based upon the first feature dataset. Module 106b executes (step 204) trained outcome prediction ML model 107 to the first feature dataset as input to generate a second feature dataset and a first predicted value for a target outcome based upon the second feature dataset. In some embodiments, module 106b executes outcome prediction ML model 107 using the first feature dataset to generate the predicted value for the target outcome and the corresponding second feature dataset. As shown in FIG. 1, outcome prediction ML model 107 comprises a value predictor function 108a and an optimizer function 108b which work together to generate predicted values for a target outcome and continually iterate on the feature dataset in order to optimize the prediction. In one exemplary embodiment, value predictor function 108a comprises a K-nearest neighbor (KNN) regression algorithm (as described in N. S. Altman, "An Introduction to Kernel and Nearest Neighbor Nonparametric Regression," *The American Statistician*, 46:3, pp. 175-185 (1992)) and optimizer function 108b comprises a black-box optimization (BBO) algorithm (as described in B. Doerr et al., "Fast Genetic Algorithms," arXiv: 1703.03334v2 [cs.NE] 15 Mar. 2017, available at arxiv.org/pdf/1703.03334). As an example, the BBO regression algorithm for a given optimization problem can be selected using one or more methodologies such as the Nevergrad gradient-free optimization platform available from Facebook AI Research (facebookresearch.github.io/nevergrad/) and as described in L. Meunier et al., "Black-Box Optimization Revisited: Improving Algorithm Selection Wizards through Massive Benchmarking." arXiv: 2010.04542.v3 [cs.LG] 23 Feb. 2021, available at arxiv.org/pdf/2010.04542). Generally, model training and execution module 106b uses optimizer function 108b to translate constraints and preferences (e.g., provided by a user) into optimization constraints that are then incorporated into the model 107 by changing one or more features of the current input feature dataset as stored in optimizer function 108b. Optimizer function 108b then uses value predictor function 108a to rapidly iterate (e.g., by adjusting values for one or more of the dynamic attributes in the feature dataset) and optimize the target outcome value based upon the constraints and preferences. The resulting output of optimizer function 108b is (a) the optimized target outcome value generated by value predictor function 108a and (b) the second feature dataset comprising one or more static and/or dynamic attributes used as input to value predictor function 108a which caused function 108a to generate the optimized target outcome value. Model training and execution module 106b can provide the output to user interface module 106c, which communicates with client computing device 102 to display (step 206) the optimized target outcome value and/or the second feature dataset to a user of client device 102.

Next, model training and execution module 106b receives (step 208) input corresponding to one or more preferences or constraints from the client computing device 102. For example, the user at client device 102 can review the optimized target outcome value and/or second feature dataset and determine that one or more of the target outcome value or aspects of the second feature dataset are not desirable. In some embodiments, the user provides input in response to the displayed data that causes model training and execution module 106b to adjust outcome prediction ML model 107 in order to generate a third feature dataset and/or a second predicted value for the target outcome. As an example, the user can interact with one or more user interface elements to provide instructions—e.g., by providing chat messages and/or spoken audio to client computing device 102. In some embodiments, client device 102 converts spoken audio into a text string (using speech-to-text programming) which is transmitted to model training and execution module 106b.

Module 106b converts the instructions into one or more model adjustment operations and applies the model adjustment operations to adjust (step 210) outcome prediction ML model 107. Generally, model adjustment operations comprise programmatic operations to change one or more aspects of the feature dataset in optimizer function 108b in outcome prediction ML model 107 to reflect the preferences or constraints of the user. In some embodiments, module 106b converts the user input received from client computing device 102 into adjustment operations by determining one or more intents associated with the user input using, e.g., a natural language processing (NLP) algorithm, and mapping the determined intents to one or more adjustment operations. For example, the user input may indicate that the user is unhappy with one or more attributes in the second feature dataset and is asking module 106b for a target outcome that is based upon attribute(s) that are closer to the user's preferred or constrained attribute value(s). Using an NLP algorithm, module 106b can determine that the user's intent is to achieve a target outcome value that falls within a certain threshold of the current optimized target outcome value while also reducing the delta between one or more dynamic attributes in the second feature dataset and the user's preferred value for those attribute(s). Based upon this intent, module 106b can apply one or more adjustment operations to outcome prediction ML model 107 to incorporate the determined intent of the user.

As can be appreciated, there are multiple different types of adjustment operations that module 106b can apply within the described framework, such as:

1. Make a dynamic attribute static: for example, a user may provide input, e.g., "Do not change my retirement age." Module 106b can apply a corresponding adjustment operation that has the effect of moving a dynamic attribute ("retirement age") into a pool of static attributes. Therefore, the "retirement age" attribute would not be eligible to be changed by ML model 107 when generating second feature dataset, remaining at its original value.
2. Limit a maximum change: for example, a user may provide input, e.g., "Do not change my retirement age by more than 2 years." Module 106b can apply a corresponding adjustment operation that has the effect of adding a constraint to optimizer function 108b within ML model 107 that would prevent optimizer function 108b from generating second feature datasets where the change in "retirement age" compared to the first feature dataset is greater than the value specified by the user (in this example, "2"). As a result, all second, third, or later feature datasets generated by optimizer function 108b and ML model 107 would have a limited change in the retirement age attribute.
3. Lower change without explicit limit: for example, a user may provide input, e.g., "Do not change my retirement age that much" (assuming that the second feature dataset has already been created and presented to the user). Module 106b can apply a corresponding adjustment operation that has the effect of both adding a constraint to optimizer function 108b (similar to point #2 above), but also adds a new loss term to optimizer function 108b that penalizes the difference between the "retirement age" attributes of any proposed second feature dataset and the first feature dataset. This additional loss term makes optimizer function 108b more biased towards keeping the change in "retirement age" to a minimum. As a result, the changes in "retirement age" would only be "optimal" if it leads to a change large enough in the target value of "retirement score."

Model training and execution module 106b then executes (step 212) the adjusted outcome prediction ML model 107 (that now has the changed second feature dataset) to generate a third feature dataset and a second predicted value for the target outcome. In some embodiments, the adjustment operations cause optimizer function 108b to change one or more dynamic attributes in the second feature dataset during application of ML model 107 and determine a corresponding target outcome value for the changed dynamic attributes. When optimizer function 108b determines that the target outcome value is the optimized value based upon the constraints or preferences, optimizer function 108b captures the static and dynamic attributes that value predictor function 108a used to produce the optimized value. Model training and execution module 106b transmits the second predicted target outcome value and/or the third feature dataset to user interface module 106c for display (step 214) on the client computing device 102.

In some embodiments, value predictor function 108a is pretrained to generate a predicted target outcome value for a particular optimization problem using, e.g., historical data for one or more other entities. For example, model training and execution module 106b can perform a model training process by retrieving a training dataset comprising historical static attributes and dynamic attributes, and corresponding predicted target outcome values, for one or more entities from, e.g., entity features database 110a. Module 106b then trains value predictor function 108a (e.g., a KNN-based model) using the training dataset to predict target outcome values for an incoming feature dataset as described above. In some embodiments, model training and execution module 106b performs training of the value predictor function 108a in real time during a user session after determining a feature dataset (including static and dynamic attributes) from the historical data, that will be used to predict the target outcome value.

One exemplary application of the technology herein is to perform data-driven optimization of a retirement plan outcome for a particular user or users. For example, system 100 can leverage machine learning optimization algorithms on a set of static and/or dynamic user attributes to predict a target outcome for the user's retirement. In this application, system 100 applies a machine learning model (i.e., outcome prediction ML model 107) to certain user attributes (e.g., current age, income account balances, retirement age, retirement savings) to generate both a predicted retirement plan score along with a different set of user attributes that the model used to generate the prediction. System 100 then receives feedback from the user in the form of user preferences or constraints, such as whether to change one or more of the user attributes and maximum or minimum limits of change. Optimizer function 108b of ML model 107 automatically adjusts the designated user attributes based upon the preferences or constraints using, e.g., a BBO algorithm and re-executes the machine learning model that now has the adjusted user attributes to generate another predicted retirement plan score. As can be appreciated, system 100 can repeat this process many times—each time soliciting new user feedback—until the user is satisfied with the retirement plan score and/or until the score reaches a desired threshold. Then, system 100 can provide the retirement plan score and/or user attributes used by the model to generate the score to another computing system for creation of a new retirement plan or modification to an existing retirement plan.

However, it should be appreciated that retirement plan optimization is merely one of a number of different applications for the technology described herein. In fact, any technological problem or application that seeks an optimized outcome or solution may be eligible to utilize the data-driven optimization techniques as presented herein. Other applications for the technology are described in this specification. These other applications are also exemplary and should not be construed as limiting the scope of the technology described herein.

Figure 3:
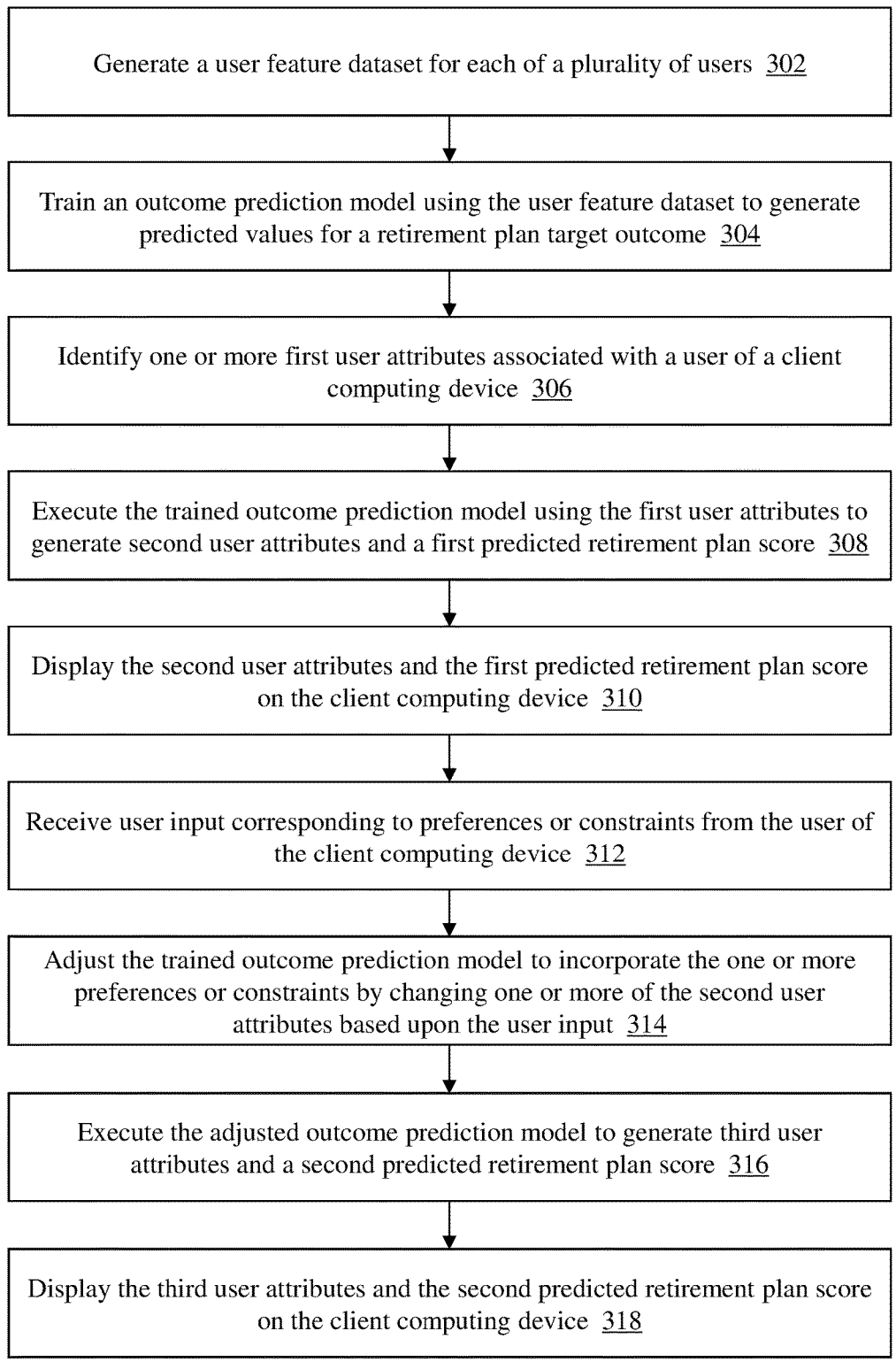
FIG. 3 is a flow diagram of a computerized method of automatic data-driven optimization of a retirement plan target outcome using machine learning.

FIG. 3 is a flow diagram of a computerized method 300 of automatic data-driven optimization of a retirement plan target outcome using machine learning, using system 100 of FIG. 1. Feature dataset generation module 106a generates (step 302) a user feature dataset for each of a plurality of users. In one embodiment, module 106a generates the user feature dataset using, e.g., user profile data stored in one or more databases such as entity features database 110a. FIG. 4 is a diagram of an exemplary user feature dataset 400 generated by module 106a for retirement plan optimization. As shown in FIG. 4, the dataset 400 comprises static attributes 402 (e.g., age, location, income), dynamic attributes 404 (e.g., expenses, contributions), and target outcome 406 (e.g., retirement plan score). In some embodiments, module 106a can retrieve an existing retirement plan score from database 110a. In other embodiments, the retirement plan score may be blank or empty—which may indicate that the system has not previously determined a retirement plan score for the user.

Once the user feature dataset is generated, feature dataset generation module 106a provides the dataset to model training and execution module 106b. Module 106b trains (step 304) outcome prediction ML model 107 using the user feature dataset to generate predicted values for a retirement plan target outcome. As an example, when the value predictor function 108a comprises a KNN model, module 107 trains the KNN model in a supervised manner using at least a portion of the user feature dataset as a training dataset to enable the trained value predictor function 108a to generate a prediction of a retirement plan score based upon input user features and attributes. In some embodiments, the training step is performed before a particular user accesses system 100 to optimize their retirement plan score, such that model 107 is pre-trained and ready for use in a production computing system. Once model 107 is trained, specific users can access server computing device 106 to view their retirement plan score and/or provide feedback in the form of constraints or preferences which are used by server computing device to adjust one or more of the user's dynamic attributes and optimize the user's retirement plan score. In some embodiments, training and/or re-training of the KNN model can occur during evaluation of the user's retirement plan score based upon, e.g., additional data obtained from other users of the system or from the present user.

One or more users at client computing devices 102 can then access server computing device 106 in order to review and adjust their retirement plan scores through real-time feedback-driven exploration. In some embodiments, a user at client computing device 102 can execute one or more software applications that are used to provide input to and receive output from server computing device 106. For example, client computing device 102 can be configured to execute one or more native applications and/or one or more browser applications. Generally, a native application is a software application (in some cases, called an 'app' or 'skill') that is installed locally on client computing device 102 and written with programmatic code designed to interact with an operating system that is native to client computing device 102. Such software may be available from, e.g., the Apple@ App Store, the Google® Play Store, the Microsoft® Store, or other software download platforms depending upon, e.g., the type of device used. In some embodiments, a native application includes a software development kit (SDK) module that is executed by a processor of client computing device 102 to perform functions associated with automatic data-driven optimization of a target outcome using machine learning as described herein. As can be appreciated, examples of native application include but are not limited to, an app on a smartphone, a virtual assistant platform on a smart speaker (e.g., Amazon® Alexa™), and so forth. A user can interact with the native application using text-based chat messages and/or spoken utterances that are received by the application and converted into machine-readable text (using, e.g., a speech-to-text algorithm).

Generally, a browser application comprises software executing on a processor of client computing device 102 that enables the client computing device to communicate via HTTP or HTTPS with remote servers addressable with URLs (e.g., server computing device 106) to receive website-related content, including one or more webpages, for rendering in the browser application and presentation on the display device coupled to the client computing device 102. Exemplary mobile browser application software includes, but is not limited to, Firefox™, Chrome™, Safari™, and other similar software. The one or more webpages can comprise visual and audio content for display to and interaction with a user.

In some embodiments, a user at client computing device 102 can log into a native application and/or a browser application on client computing device 102 to interact with user interface module 106c of server computing device 106 via network 104. For example, the user may have an account with an entity that operates server computing device 106 and the user can log into that account in order to review their account and retirement plan and interact with model training and execution model 106b via an application front-end in order to review, explore, and optimize retirement plan scores and attributes, among other functions. In some embodiments, when the user logs into the application, they provide authentication credentials (e.g., username, password) which are used by the user interface module 106c to identify the user and to retrieve a user profile that contains certain user-specific information (e.g., demographics, account information, retirement plan information, static user attributes, dynamic user attributes) that can be used by model training and execution module 106b for optimization of the user's retirement plan score as described herein.

Based upon the user profile information, module 106b identifies (step 306) one or more first user attributes associated with the user of client computing device 102. In some embodiments, the first user attributes comprise static attributes associated with the user (such as age, location, income as shown in FIG. 4). In other embodiments, the first user attributes comprise both static attributes and an initial set of user preferences or constraints as captured from client computing device 102 and/or from the user profile information. For example, module 106b can determine a retirement risk profile associated with the user or a set of retirement goals or objectives pre-configured for the user and generate one or more constraints or preferences for the user associated with the determined information.

Model training and execution module 106*b* executes (step 308) the trained outcome prediction ML model 107 using the first user attributes to generate second user attributes and a first predicted retirement plan score. In some embodiments, module 106*b* executes optimizer function 108*b* of model 107, which captures the first user attributes from feature dataset generation module 106*a*, user interface module 106*c*, and/or entity features database 110*a*. Optimizer function 108*b* converts the first user attributes into input for execution of value predictor function 108*a* to generate second user attributes (i.e., dynamic attributes such as a predicted retirement expense amount of the user and/or a predicted retirement age of the user) and a first predicted retirement plan score based upon the first user attributes and the second user attributes. In some embodiments, optimizer function 108*b* performs a plurality of executions of the value optimizer function 108*a* in order to rapidly iterate and optimize the retirement plan score. For each execution of value optimizer function 108*a* or periodically during the iteration process, optimizer function 108*b* adjusts the dynamic attributes used while also taking account of the user's preferences and constraints (if available) in order to generate further predicted retirement plan scores and arrive at an optimized retirement plan score.

Figure 5B:
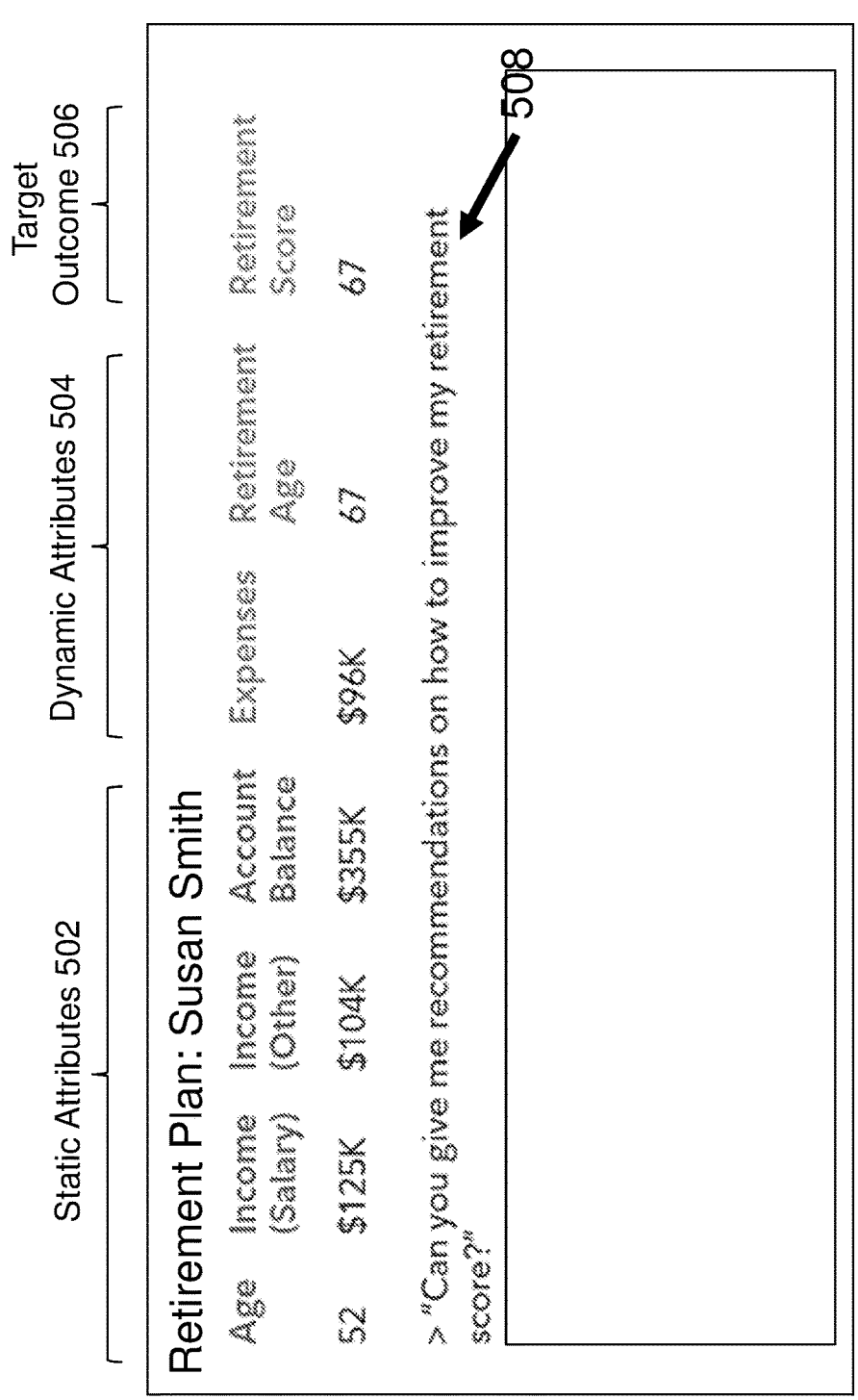
FIG. 5B is a diagram of an exemplary user interface generated by user interface module after the user has provided input relating to the displayed retirement plan score and dynamic attributes.

Once optimizer function 108*b* has generated a first predicted retirement plan score and related second user attributes, user interface module 106*c* displays (step 310) the second user attributes and the first predicted retirement plan score to the user of client computing device 102. FIG. 5A is a diagram of an exemplary user interface generated by user interface module 106*c* for display of the second user attributes and the first predicted retirement plan score. As shown in FIG. 5A, the user interface includes the static attributes for the user (age, income (salary), income (other), account balance) and dynamic attributes for the user (expenses, retirement age) based upon execution of value predictor function 108*b*. The user interface also includes the predicted retirement plan score (67) for the user based upon the attributes (in this case, the score is placed on a scale of 0-200, with a higher score indicating a stronger retirement plan). The user interface also includes an input prompt 508 to enable the user at client computing device 102 to provide feedback (e.g., in the form of text and/or spoken utterances) that reflect one or more user preferences or constraints that are used by model training and execution module 106*b* to guide the generation of subsequent predictions for retirement plan scores by model 107. In some embodiments, the user interface includes a directive or suggestion for the user in providing feedback, such as "How do you feel about the retirement plan shown here?" In some embodiments, the user preferences or constraints can relate to the dynamic attributes presented to the user. For example, the user may desire to retire at an earlier age than shown on the screen. As a result, the user can provide this feedback to client computing device 102 in the form of specific constraints (e.g., "I want to retire at age 59") or preferences (e.g., "The retirement age seems too high, can it be lowered?") that will affect subsequent execution of ML model 107 to generate optimized retirement plan scores and further dynamic attributes. FIG. 5B is a diagram of the user interface after the user has provided input relating to the displayed retirement plan score and dynamic attributes. As shown in FIG. 5B, the user has provided input of "Can you give me recommendations on how to improve my retirement score?"

The user provides the corresponding input to client computing device 102, which transmits the input via user interface module 106*a* to model training and execution module 106*b*. Module 106*b* receives (step 312) the user input corresponding to the preferences or constraints from the user of client computing device 102. Module 106*b* adjusts (step 314) the trained outcome prediction ML model 107 to incorporate the user's preferences or constraints by changing one or more of the second user attributes based upon the user input. As mentioned previously, in some embodiments the user input is received by module 106*b* in the form of a text string that comprises the user input. In some embodiments, module 106*b* converts the user input received from client computing device 102 into one or more adjustment operations that are applied to ML model 107 to account for the user's preferences and constraints. In one example, module 106*b* converts the text string into one or more adjustment operations through application of a natural language processor (NLP) function. The NLP function is configured to analyze the text string to determine attributes such as meaning, context, and user intent. Module 106*b* can utilize the output of NLP function to identify one or more adjustment operations that correspond to the user intent in the text string. In some embodiments, the NLP function comprises a natural language understanding (NLU) model such as, but not limited to: IBM® Watson™ available from IBM Corp.; Google® Dialogflow™ available from Google, Inc.; Rasa™ available from; and Microsoft® LUIS™ available from Microsoft Corp. Further detail on these types of NLUs is described in A. Abdellatif et al., "A Comparison of Natural Language Understanding Platforms for Chatbots in Software Engineering." arXiv:2012.02640v2 [cs.SE] 22 Jul. 2021. Once the user intent is determined, module 106*b* can identify one or more adjustment operations that accomplish the desired user intent and apply those adjustment operations to change one or more of the dynamic user attributes prior to execution the value predictor function 108*a*.

For example, when a user provides the text string of "I want to lower my retirement age" and the current dynamic attribute value for retirement age is 66, module 106*b* can determine the user intent is to reduce the value of the retirement age and identify a corresponding adjustment operation that matches the intent (such as the optimization process described above). Then, module 106*b* can provide the adjustment operation to optimizer function 108*b*, which applies the adjustment operation to change the retirement age dynamic attribute value as necessary based upon the adjustment operation and re-execute the value predictor function 108*a* with this new value for retirement age. In another example, when the user provides the text string of "Can you give me recommendations on how to improve my retirement score?," module 106*b* can determine the user intent is to increase the retirement plan score. Module 106*b* identifies a corresponding adjustment operation that matches the intent (such as the optimization process described above) and provides the operation to optimizer function 108*b* for re-execution of value predictor function 108*a*.

Figure 5C:
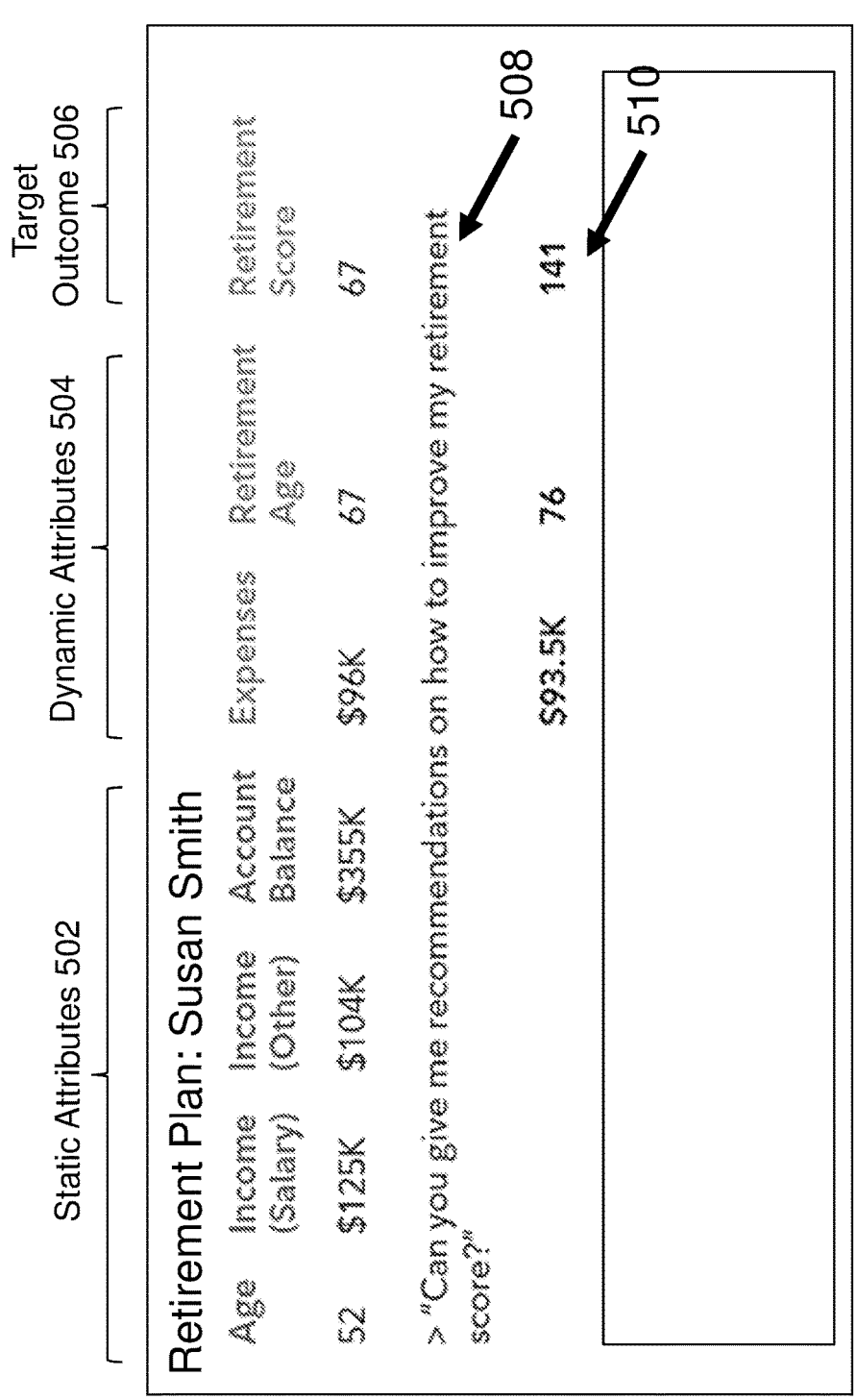
FIG. 5C is a diagram of an exemplary user interface generated by user interface module after model training and execution module has generated a new optimized retirement plan score and related dynamic attributes.

Module 106*b* executes (step 316) the adjusted outcome prediction ML model 107 to generate one or more third user attributes (e.g., new dynamic attributes based upon the user input) and a corresponding second predicted retirement plan score). Specifically, optimizer function 108*b* executes value predictor function 108*a* using the new dynamic attributes (which reflect the user input) in order to generate a new optimized retirement plan score. As mentioned above, optimizer function 108*b* can execute value predictor function 108*a* many times to rapidly iterate and optimize the outcome. Once optimizer function 108*b* has generated a second predicted retirement plan score and related third user attributes, user interface module 106*c* displays (step 318) the third user attributes and the second predicted retirement plan score to the user of client computing device 102. FIG. 5C is a diagram of the user interface after model training and execution module 106*b* has generated a new optimized retirement plan score and related dynamic attributes. As shown in FIG. 5C, based upon the user input 508 previously provided, module 106*b* has executed model 107 to generate a new set of dynamic attributes (i.e., expenses: $93.5K, retirement age: 76) and a corresponding new retirement plan score (141). As can be appreciated, the new retirement plan score of 141 has greatly improved over the previously-generated score of 67—thereby properly incorporating the user's preference for improvement in the retirement plan score. However, this has caused the user's predicted retirement age to increase by 9 years, from 67 to 76, and has caused the user's predicted expenses to drop from $96K to $93.5K.

Figure 5D:
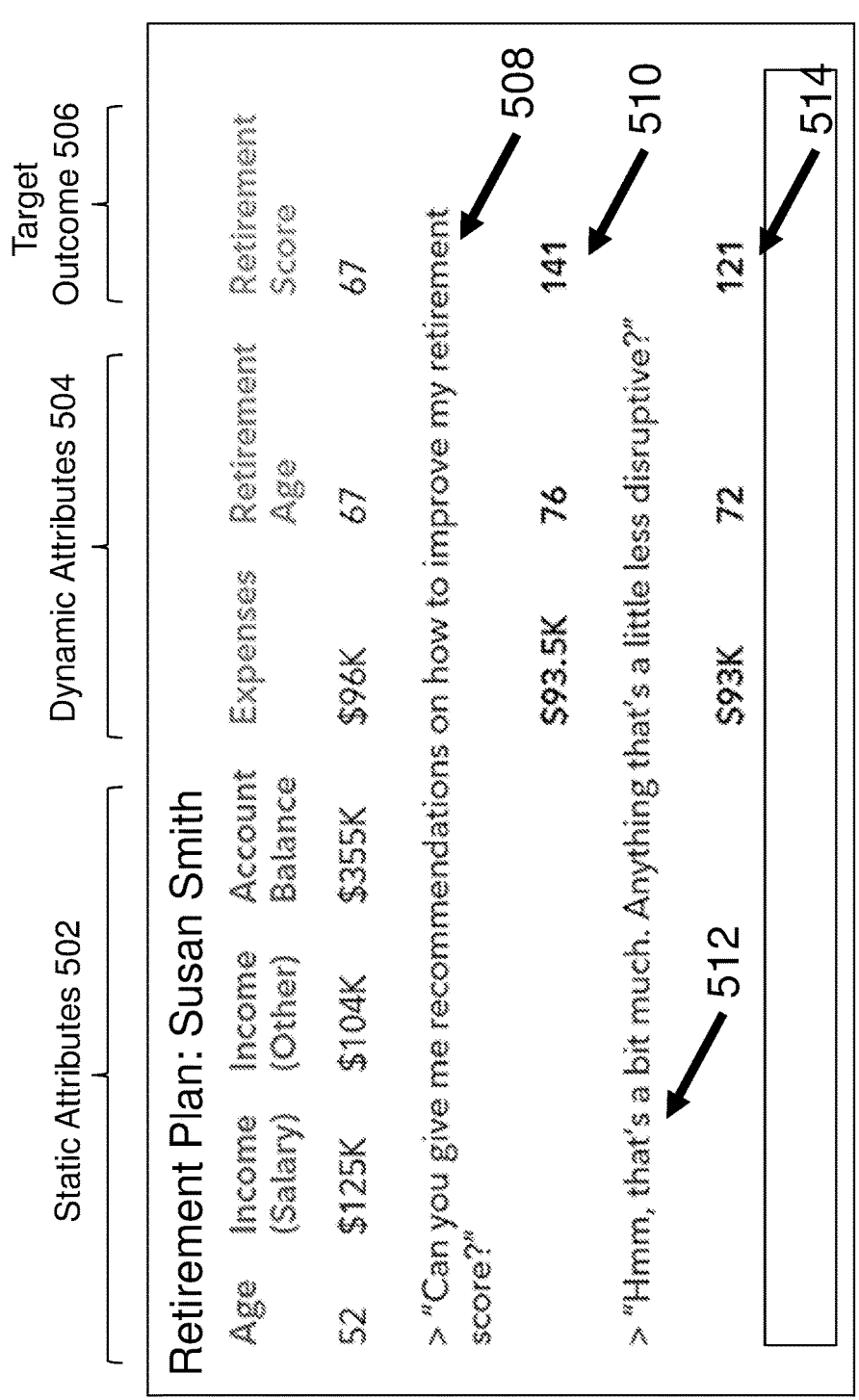
FIG. 5D is a diagram of an exemplary user interface generated by user interface module after another round of feedback from client computing device and optimization of the retirement plan score by model training and execution module.

In some instances, the user at client computing device 102 may not be satisfied with the new dynamic attributes and/or retirement plan score generated by module 106*b*. Beneficially, the user can continue to provide feedback to server computing device 106 for further exploration of retirement plan score options until the user is happy with the outcome generated by module 106*b*. FIG. 5D is a diagram of the user interface after another round of feedback from the user of client computing device 102 and optimization of the retirement plan score by module 106*b*. As shown in FIG. 5D, the user provided a second piece of feedback 512 ("Hmm, that's a bit much. Anything that's a little less disruptive?")—indicating that the user's intent is to keep the values for the dynamic attributes closer to the initial dynamic attribute values used to generate the first retirement plan score of 67. Based upon this feedback, module 106*b* executes model 107 to generate another set of dynamic attributes and optimized retirement plan score 514 (i.e., expenses: $93K; retirement age: 72; retirement plan score: 121). It should be appreciated that the further set of dynamic attributes and corresponding retirement score 514 incorporates the constraints and preferences reflected in both the first user input 508 and the second user input 512. As shown, the retirement plan score has improved from 67 (initial value) to 121 (current value) which satisfies user input 508. And, the retirement age has only increased by 5 years (from 67 to 72) instead of 9 years which satisfies user input 512. If the user is still not satisfied with the outputs from module 106*b*, the user can keep providing feedback to module 106*b* for additional execution(s) of model 107 using adjusted dynamic attributes until the user has received a set of dynamic attributes and/or retirement plan score that they approve.

It should be understood that one significant technical advantage provided by the methods and systems described herein is that model training and execution module 106*b* does not need to connect to or otherwise communicate with a data source (e.g., entity features database 110*a*) or other computing system during the iteration and optimization process described above. In traditional ML modeling and prediction systems, in order to re-execute the model, the systems must typically retrieve additional data (e.g., by calling an API) before each execution of the model. In contrast, the technology described herein advantageously uses existing user data (i.e., static attributes and dynamic attributes) during the optimization process without requiring retrieval of data from an external source. As a result, this greatly increases the speed and efficiency of the optimization process because optimizer function 108*b* can rapidly adjust the dynamic attributes and provide them to value predictor function 108*a* for generation of a predicted target outcome, then repeat this process as many times as necessary to provide a set of dynamic attributes and target outcome that satisfies the constraints and objectives of the user.

Figure 5E:
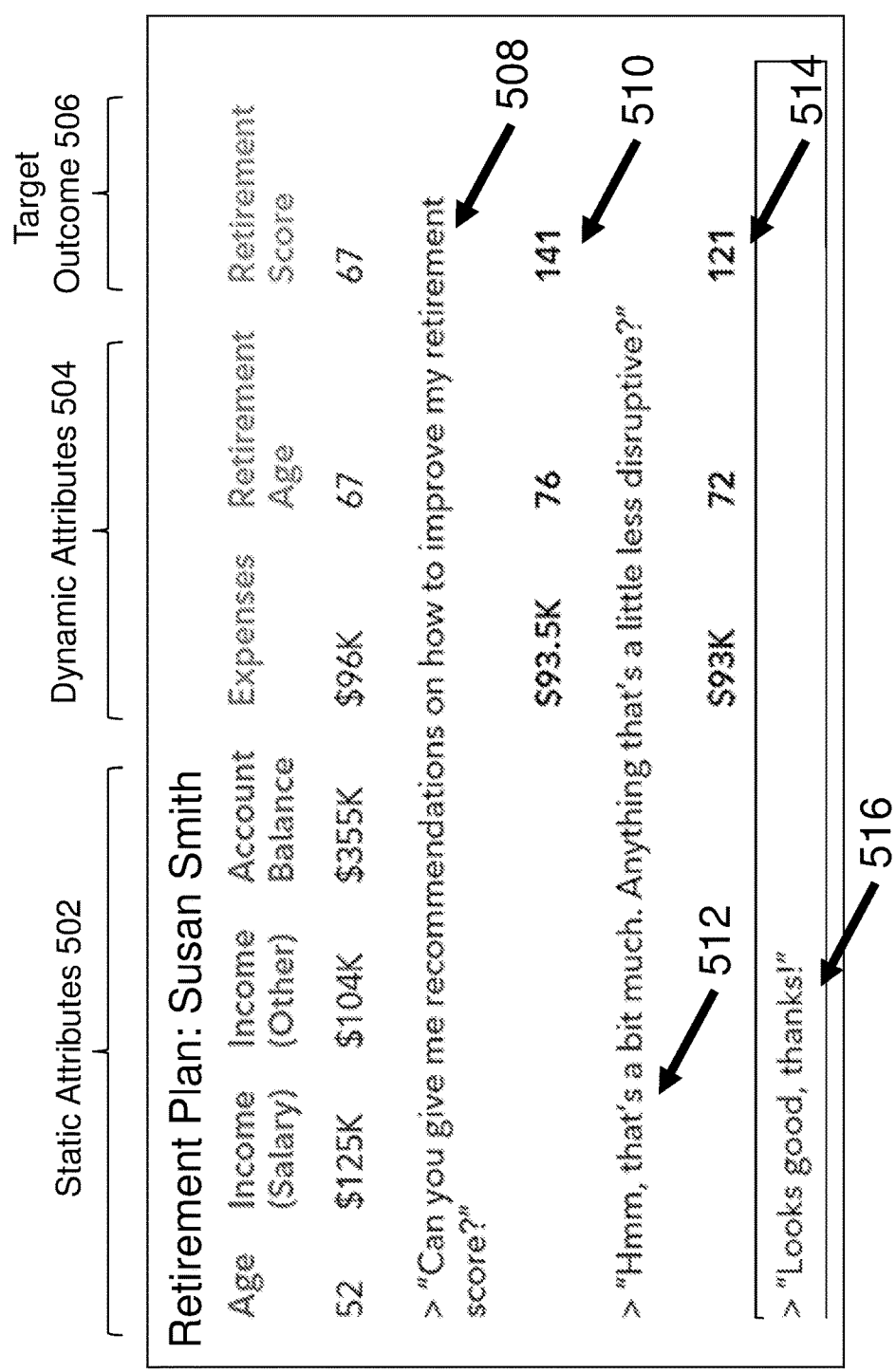
FIG. 5E is a diagram of an exemplary user interface generated by user interface module indicating that the user has accepted the current retirement plan score and related dynamic attributes.

When the user is happy with the output displayed on screen, the user can indicate their acceptance through subsequent feedback provided to client computing device 102. FIG. 5E is a diagram of the user interface indicating that the user has accepted the current retirement plan score and related dynamic attributes. As shown in FIG. 5E, the user has entered "Looks good, thanks!" into input area 516. Upon receiving this input, module 106*b* can determine that the current set of dynamic attributes and retirement plan score are confirmed by the user and transmit instructions to one or more remote computing devices (e.g., a retirement plan execution system) to update the user's retirement plan attributes (e.g., contributions) and/or investment strategies to reflect the accepted dynamic attributes. For example, module 106*b* can transmit one or more API commands to a remote computing system that identify the user and/or user's retirement account and instruct the remote computing system to modify the user's retirement plan so as to achieve the dynamic attributes approved by the user.

As set forth above, the methods and systems described herein lend themselves to many different applications and data optimization procedures. Other exemplary applications for the technology are described in the following section, and these applications should not be construed as limiting the scope of the technology described herein.

Sports, e.g., fixed-course time trial challenges—There are many fixed-course time trial challenges in sports that aim to test the fitness and aptitude of the players competing in the challenges. As fixed-course time trials, the aim is to complete the challenge as fast as possible on a predetermined course that the competitors all need to follow. One example is the qualification stage of a Formula 1 race. The qualification stage is a session before a Formula 1 race where drivers compete to achieve the fastest lap time around the racetrack, which determines the starting order of the race. The aim of a Formula 1 team is to provide a fast car for their driver, while the aim of the driver is to fully utilize the capabilities of the car to achieve the best time on the scoreboard.

Often, drivers only get a few chances to put in their best times. However, the teams have data from practice sessions and from other drivers that are competing in the session. Moreover, teams have access to telemetry data, such as the position, velocity, angle, and the car gear all throughout the session. Information such the velocity of the car, the gear, and the direction it is pointing at are crucial indicators of how fast a car is able to go through a corner of the racetrack.

Using the data-driven optimization techniques described in this specification, teams and drivers can leverage historical race/time trial data at both an individual corner level and at the racetrack level to generate suggestions on how the driver can position the car to achieve the most improvement in the lap time. Moreover, if a driver does not wish to apply the suggestion generated by the system 100 during the qualification process, perhaps after attempting it once on the racetrack, the ML model 107 can be constrained to suggest a different a different position or a different corner to change.

Machine Design, e.g., building a computer—the personal computer (PC) industry is very large, with an estimated total market revenue in 2021 of $64 bn for personal computers, with nearly 360 M units sold. Many PC enthusiasts still prefer to build their own computers instead of relying on pre-built computers or laptops. However, global supply shortages can make it difficult to find some of the parts necessary for PCs, and they are often available at different price points at different locations.

Since PCs are expensive, PC enthusiasts build their computers with specific purposes, such as gaming, productivity, or video editing. Reviewers often evaluate new PC components within these paradigms and offer benchmark results to the public. Moreover, crowdsourced PC benchmarks can be found online, which offer performance numbers given the PC components.

Using the data-driven optimization techniques described in this specification, model training and execution module 106b can select technical attributes of a user's current PC as an initial set of static/dynamic attributes and provide suggestions on what component(s) to replace to achieve the maximum improvement in their preferred task, such as gaming or video editing. Moreover, module 106b can apply budget constraints (such as a maximum $500 budget) or component constraints (such as a specific part not being available for purchase) and provide a degree of personalization for the user.

Healthcare, e.g., lifestyle changes to improve health—Currently, many healthcare apps exist that advocate a healthy lifestyle. Usually, these apps recommend a similar blend of dietary restrictions and exercise amounts to their users. The users can choose their daily calorie targets and their current exercise habits, and the apps usually start less intrusive and ramp up in terms of the suggestions they make.

Using the data-driven optimization techniques described in this specification, model training and execution module 106b can utilize existing lifestyle attributes from other users to provide suggestions that would not only promote a healthier lifestyle but would have demonstrably worked for other users. Moreover, users would be able to add their own restrictions and preferences, vary them over time, and still get suggestions that promote a healthier lifestyle.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for automatic data-driven optimization of a retirement plan target outcome using machine learning, the system comprising a server computing device with a memory for storing computer-executable instructions and a processor that executes the computer-executable instructions to:
   generate a user feature dataset comprising static attributes and dynamic attributes for each of a plurality of users;
   train an outcome prediction model using the user feature dataset to generate predicted values for a retirement plan target outcome;
   identify one or more first user attributes associated with a user of a client computing device;
   execute the trained outcome prediction model using the first user attributes to generate one or more second user attributes and a first predicted retirement plan score based upon the second user attributes;
   display the second user attributes and the first predicted retirement plan score to the user of the client computing device;
   receive user input corresponding to one or more preferences or constraints from the user of the client computing device;
   adjust the trained outcome prediction model to incorporate the one or more preferences or constraints by changing one or more of the second user attributes based upon the user input;
   execute the adjusted outcome prediction model to generate one or more third user attributes and a second predicted retirement plan score based upon the one or more third user attributes; and
   display the third user attributes and the second predicted retirement plan score to the user of the client computing device.

2. The system of claim 1, wherein identifying one or more first user attributes associated with a user of a client computing device comprises:
   receiving a request to access a retirement plan application from the client computing device, the request including authentication credentials associated with the user;
   locating a user profile data structure for the user based upon the authentication credentials; and
   selecting the one or more first user attributes associated with the user from the user profile data structure.

3. The system of claim 2, wherein the one or more first user attributes comprise static user attributes and dynamic user attributes.

4. The system of claim 3, wherein the static user attributes comprise an age of the user, an income of the user and an account balance of the user, and the dynamic user attributes comprise a retirement expense amount of the user and a retirement age of the user.

5. The system of claim 1, wherein the user input corresponding to one or more preferences or constraints comprises a text string corresponding to an utterance of the user.

6. The system of claim 5, wherein adjusting the trained outcome prediction model to incorporate the one or more preferences or constraints by changing one or more of the second user attributes based upon the user input comprises:
   converting the text string into one or more adjustment operations; and
   applying the adjustment operations to change one or more of the second user attributes.

7. The system of claim 6, wherein converting the text string into one or more adjustment operations comprises:
   determining one or more intents associated with the text string using a natural language processor; and
   mapping the one or more intents to the one or more adjustment operations.

8. The system of claim 1, wherein the server computing device:
   receives additional user input corresponding to one or more additional preferences or constraints from the user of the client computing device;
   re-adjusts the adjusted outcome prediction model to incorporate the one or more additional preferences or constraints by changing one or more of the third user attributes based upon the additional user input;
   executes the re-adjusted outcome prediction model to generate one or more fourth user attributes and a third predicted retirement plan score based upon the one or more fourth user attributes; and displays the fourth user attributes and the third predicted retirement plan score to the user of the client computing device.

9. The system of claim 1, wherein the server computing device transmits instructions comprising the third user attributes to a remote computing device for updating the user's retirement plan.

10. The system of claim 9, wherein the server computing device transmits the instructions to the remote computing device upon determining that the second predicted retirement plan score meets or exceeds a predetermined threshold.

11. The system of claim 9, wherein the server computing device transmits the instructions to the remote computing device upon receiving score acceptance indicia from the user of the client computing device.

12. The system of claim 1, wherein the outcome prediction model comprises a predictor function and an optimizer function.

13. The system of claim 12, wherein the predictor function comprises a K-nearest neighbor regression algorithm and the optimizer function comprises a black-box optimization (BBO) algorithm.

14. The system of claim 1, wherein the user feature dataset comprises a synthetic user feature dataset created through automated variation of the static attributes and the dynamic attributes.

15. A computerized method of automatic data-driven optimization of a retirement plan target outcome using machine learning, the method comprising:

generating, by a server computing device, a user feature dataset comprising static attributes and dynamic attributes for each of a plurality of users;

training, by the server computing device, an outcome prediction model using the user feature dataset to generate predicted values for a retirement plan target outcome;

identifying, by the server computing device, one or more first user attributes associated with a user of a client computing device;

executing, by the server computing device, the trained outcome prediction model using the first user attributes to generate one or more second user attributes and a first predicted retirement plan score based upon the second user attributes;

displaying, by the server computing device, the second user attributes and the first predicted retirement plan score to the user of the client computing device;

receiving, by the server computing device, user input corresponding to one or more preferences or constraints from the user of the client computing device;

adjusting, by the server computing device, the trained outcome prediction model to incorporate the one or more preferences or constraints by changing one or more of the second user attributes based upon the user input;

executing, by the server computing device, the adjusted outcome prediction model to generate one or more third user attributes and a second predicted retirement plan score based upon the one or more third user attributes; and displaying, by the computing device, the third user attributes and the second predicted retirement plan score to the user of the client computing device.

16. The method of claim 15, wherein identifying one or more first user attributes associated with a user of a client computing device comprises:

receiving a request to access a retirement plan application from the client computing device, the request including authentication credentials associated with the user;

locating a user profile data structure for the user based upon the authentication credentials; and selecting the one or more first user attributes associated with the user from the user profile data structure.

17. The method of claim 16, wherein the one or more first user attributes comprise static user attributes and dynamic user attributes.

18. The method of claim 17, wherein the static user attributes comprise an age of the user, an income of the user and an account balance of the user, and the dynamic user attributes comprise a retirement expense amount of the user and a retirement age of the user.

19. The method of claim 15, wherein the user input corresponding to one or more preferences or constraints comprises a text string corresponding to an utterance of the user.

20. The method of claim 19, wherein adjusting the trained outcome prediction model to incorporate the one or more preferences or constraints by changing one or more of the second user attributes based upon the user input comprises:

converting the text string into one or more adjustment operations; and applying the adjustment operations to change one or more of the second user attributes.

21. The method of claim 20, wherein converting the text string into one or more adjustment operations comprises:

determining one or more intents associated with the text string using a natural language processor; and mapping the one or more intents to the one or more adjustment operations.

22. The method of claim 15, further comprising:

receiving, by the server computing device, additional user input corresponding to one or more additional preferences or constraints from the user of the client computing device;

re-adjusting, by the server computing device, the adjusted outcome prediction model to incorporate the one or more additional preferences or constraints by changing one or more of the third user attributes based upon the additional user input;

executing, by the server computing device, the re-adjusted outcome prediction model to generate one or more fourth user attributes and a third predicted retirement plan score based upon the one or more fourth user attributes; and displaying, by the server computing device, the fourth user attributes and the third predicted retirement plan score to the user of the client computing device.

23. The method of claim 15, further comprising transmitting, by the server computing device, instructions comprising the third user attributes to a remote computing device for updating the user's retirement plan.

24. The method of claim 23, wherein the server computing device transmits the instructions to the remote computing device upon determining that the second predicted retirement plan score meets or exceeds a predetermined threshold.

25. The method of claim 23, wherein the server computing device transmits the instructions to the remote computing device upon receiving score acceptance indicia from the user of the client computing device.

26. The method of claim 15, wherein the outcome prediction model comprises a predictor function and an optimizer function.

27. The method of claim 26, wherein the predictor function comprises a K-nearest neighbor regression algorithm and the optimizer function comprises a black-box optimization (BBO) algorithm.

28. The method of claim 15, wherein the user feature dataset comprises a synthetic user feature dataset created through automated variation of the static attributes and the dynamic attributes.

* * * * *

UNITED STATES PATENT AND TRADEMARK OFFICE
CERTIFICATE OF CORRECTION

PATENT NO. : 12,169,870 B2  
APPLICATION NO. : 18/108715  
DATED : December 17, 2024  
INVENTOR(S) : Doruk Kilitcioglu et al.

Page 1 of 1

It is certified that error appears in the above-identified patent and that said Letters Patent is hereby corrected as shown below:

In the Specification

Column 8, Line 30 reads:  
"tion Wizards through Massive Benchmarking." arXiv:"  
Should read:  
--tion Wizards through Massive Benchmarking," arXiv:--

Column 12, Line 5 reads:  
"Apple@ App Store, the Google® Play Store, the Microsoft®"  
Should read:  
--Apple® App Store, the Google® Play Store, the Microsoft®--

Column 14, Line 29 reads:  
"ware Engineering." arXiv:2012.02640v2 [cs.SE] 22 Jul."  
Should read:  
--ware Engineering," arXiv:2012.02640v2 [cs.SE] 22 Jul.--

Signed and Sealed this  
Eighteenth Day of March, 2025

Coke Morgan Stewart  
*Acting Director of the United States Patent and Trademark Office*